United States Patent [19]

McAlonie et al.

[11] 3,740,490

[45] June 19, 1973

[54] TONE RINGER

[75] Inventors: Robert Francis McAlonie, Lincroft; Helmuth Otto Sautter, Middletown; David Carlaw Trimble, Holmdel, all of N.J.

[73] Assignee: Bell Telephone Laboratories, Incorporated, Murray Hill, N.J.

[22] Filed: Jan. 18, 1971

[52] U.S. Cl. .......................... 179/84 VF4, 179/84 T

[51] Int. Cl. .......................... H04m 1/00

[58] Field of Search ..................... 179/84 VF, 84 T, 179/84 R

[56] References Cited

UNITED STATES PATENTS

| | | | |
|---|---|---|---|
| 3,603,740 | 9/1971 | Cambridge | 179/84 VF |
| 3,508,012 | 4/1970 | Golembeski | 179/84 T |
| 3,227,813 | 1/1966 | Talcott | 179/84 T |
| 3,164,680 | 1/1965 | Adelaar | 179/84 T |
| 3,165,591 | 1/1965 | | 179/84 T |
| 3,218,395 | 11/1965 | Suda | 179/84 T |

*Primary Examiner*—Ralph D. Blakeslee
*Assistant Examiner*—William A. Helvestine
*Attorney*—Edwin B. Cave and W. L. Keefauver

[57] ABSTRACT

A tone ringer circuit for use in a telephone set employs gating means for discriminating between valid ringing signals and unwanted transients, oscillatory generator means for energizing an output tranducer, and pwoer conversion means for deriving ringing power from the input signal. The alidity of the ringing signal is determined by measurement of the energy content of a portion of each signal cpcle. The basi tone ringer may be modified to permit realization of a distinctive ringing capacity.

19 Claims, 16 Drawing Figures

INVENTORS R. F. MCALONIE
H. O. SAUTTER
D. C. TRIMBLE
BY
ATTORNEY

Patented June 19, 1973 3,740,490

6 Sheets-Sheet 2

TONE RINGER

FIELD OF THE INVENTION

This invention relates to tone ringers and, more particularly, to the type of tone ringer that may be used in a telephone system.

DESCRIPTION OF THE PRIOR ART

Conventional electromechanical bell ringers have been the primary signaling device used in telephones for a great number of years. Despite the fact that such ringers are simple, and relatively inexpensive to produce, several deficiencies are inherent in their use. Among these deficiencies are the large space and considerable mass required by the ringer circuitry and associated bell, and their frequently disturbing characteristic jangle. One solution to these and other problems, made possible by great strides in the electronics industry, has been the development of an electronic tone ringer. By making use of integrated circuit technology, and by employing an electroacoustic transducer rather than a cumbersome electromechanical bell, space requirements have been minimized, and the sound output characteristic has been altered to be pleasing to the ear and yet readily noticeable amid everyday noises encountered in places where telephones are present. In addition, due to the increased efficiency of tone ringer circuits, more sets can be attached to a given loop, and loop length can be substantially increased. An example of such an electronic tone ringer is disclosed in U.S. Pat. No. 3,508,012 issued to J. J. Golembeski et al., Apr. 21, 1970.

However, as frequently happens, solutions to old problems often themselves generate new problems requiring additional solutions.

The field of tone ringers is no exception. Thus, for example, it becomes imperative, if integrated circuits are to be employed, to design gating means capable of discriminating between valid ringing signals and unwanted voltage pulses and transients, which do not require inductors or large capacitors, since these elements are not readily amenable to incorporation in solid-state devices. Prior art tone ringers characteristically employ such elements in filter circuits, which are designed to pass valid ringing frequencies, while blocking unwanted frequencies. Such filter circuits are satisfactory if these frequencies are greatly separated. However, a difficult problem is presented when the valid and invalid signals are of the same or similar frequencies. This is the case where conventional 20 or 30 Hz ringing voltages are used, since interfering dial pulses, generated at 10 or 20 pps, have a frequency content which is almost identical to the valid signal, thus rendering discrimination difficult. As a result, new and improved gating means, using new techniques, are required.

An additional feature, which must be provided if tone ringers are to be truly effective, is the capability to produce distinctive audible signals. The ever increasing range of services offered to telephone subscribers, including PICTUREPHONE, intercom calling, and DATAPHONE, as well as conventional telephone service, necessitates the development of means to distinguish between the sound produced by one telephone or type of service and the audible signal produced by other sets or services. Where conventional electromechanical bell ringers are used, this feature is relatively simple to provide, since their sound characteristics are varied merely by adjusting the natural frequency of the resonating element. On the other hand, where tone generating transducers are used, novel electronic circuitry must be provided if the same result is to be achieved.

Accordingly, a broad object of the invention is to improve tone ringers. A further object is to provide a tone ringer circuit sensitive to valid ringing signals, and insensitive to unwanted signals and transients, that is readily and economically capable of fabrication using integrated circuit technology. An additional object is the provision of such a tone ringer with a distinctive ringing capability. A still further object is the provision of an improved tone ringer that can directly replace conventional electromechanical bell ringers without the need for any system modifications.

SUMMARY OF THE INVENTION

The problems indicated above are met in accordance with the principles of the invention by utilizing a tone ringer circuit comprising gating means for discriminating between valid ringing signals and unwanted transients, oscillatory generator means for energizing an output transducer, and power conversion means for deriving ringing power from the input ringing signal. The entire circuit is readily integratable, since no inductors or transformers are required. Space occupied by the tone ringer is thus minimized.

In accordance with an important feature of the invention, the gating means operates to distinguish between valid and invalid ringing signals by extracting a slice of each cycle of the input ringing waveform, and determining the energy contained therein. This function is accomplished by first setting a threshold level which must be exceeded by the input ringing signal. Voltages in excess of this predetermined level are then clipped by means of a symmetrical transistor circuit. The clipper output is applied to an averaging circuit designed so that a capacitor is charged to a predetermined voltage level only by signals within a desired amplitude and frequency range that have a sufficient energy content. Upon reaching this level, the charged capacitor actuates a transistor switch, which allows power to be supplied to the oscillatory generator means, which in turn drives the output transducer. The gating means thus assures that conventional 20 or 30 Hz ringing signals of from 40 to 90 volts will be sufficient to actuate the tone ringer and cause an audible output signal, but transients and pulses of up to several hundred volts of either polarity will be unable to do so.

The oscillatory generator means serves to actuate the output transducer when the aforementioned gating means is properly triggered. Power for the generator is derived from the input ringing signal. In one embodiment of the invention, an astable transistor multivibrator is used to generate oscillations of approximately 500 Hz, and provision is made, as will be later explained, to vary the frequency produced.

The power conversion means serves to convert input ringing signals to energy needed to supply the oscillatory generator. This circuit, in one embodiment, comprises a network of diodes, resistors and a transistor, which rectifies the AC input and provides a regulated voltage output. The network has characteristics essentially identical to those of a Zener diode. However, fabrication from the several above mentioned elements permits realization using integrated circuit technology.

The transducer element which converts the oscillatory generator output into audible ringing signals is, in one embodiment, a standard telephone receiver element modified by the elimination of various compensating features ordinarily needed to achieve a uniform frequency response. This device requires a minimum of space, is economical, and yet is relatively efficient in translating electrical energy to acoustic energy over the desired range of frequency. Other types of electroacoustic transducers may be used with similar success.

To provide a distinctive ringing capability, in accordance with the invention, the ordinary ringing mode of 500 Hz, modulated by the 20 or 30 Hz ringing signal, is altered to provide selectively for steady 500 Hz ringing, or frequency or amplitude modulated outputs. This modification is achieved by the addition of simple electronic circuitry to the basic ringer circuit. To provide a steady ringing tone, the 20 or 30 Hz fluctuations of the input ringing signal are eliminated. Pulse generation means are used to interrupt periodically the power supplied to the oscillatory generator, thus providing an amplitude modulated output. By periodically changing the oscillatory generator time constant, frequency modulated tones are produced. It is thus possible to obtain several different and distinctive sounds from the same basic ringer circuit.

DETAILED DESCRIPTION

Figure 1:
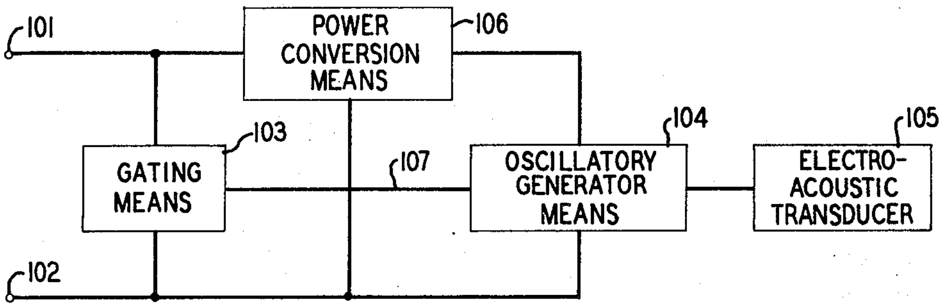
FIG. 1 is a block diagram of a basic tone ringer in accordance with the invention.

The overall arrangement of the basic tone ringer circuit is shown in block diagram form in FIG. 1. Incoming ringing signals are received over lines 101, 102 and are applied directly across gating means 103, which serves to distinguish between valid and invalid ringing signals. Upon detection of a valid signal, oscillatory generator means 104 is enabled by gating means 103 via control link 107. The frequency of the oscillatory generator means is chosen so as to produce a pleasing audible output from electroacoustic transducer 105, which is driven thereby. Power conversion means 106 serves to rectify incoming ringing signals, and to provide a source of regulated voltage to drive the oscillatory generator.

Figure 2B:
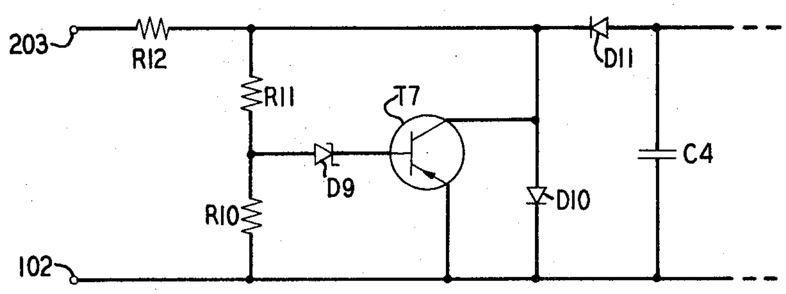
FIG. 2B is a schematic circuit diagram of the power conversion means portion of the tone ringer of FIG. 1.
Figure 2C:
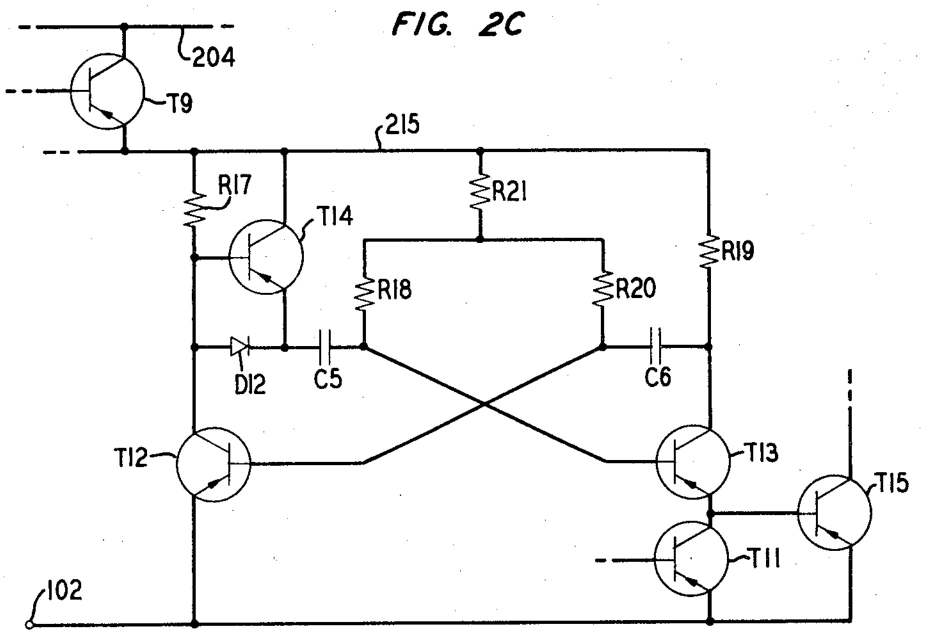
FIG. 2C is a schematic circuit diagram of the oscillatory generator means portion of the tone ringer of FIG. 1.
Figure 2A:
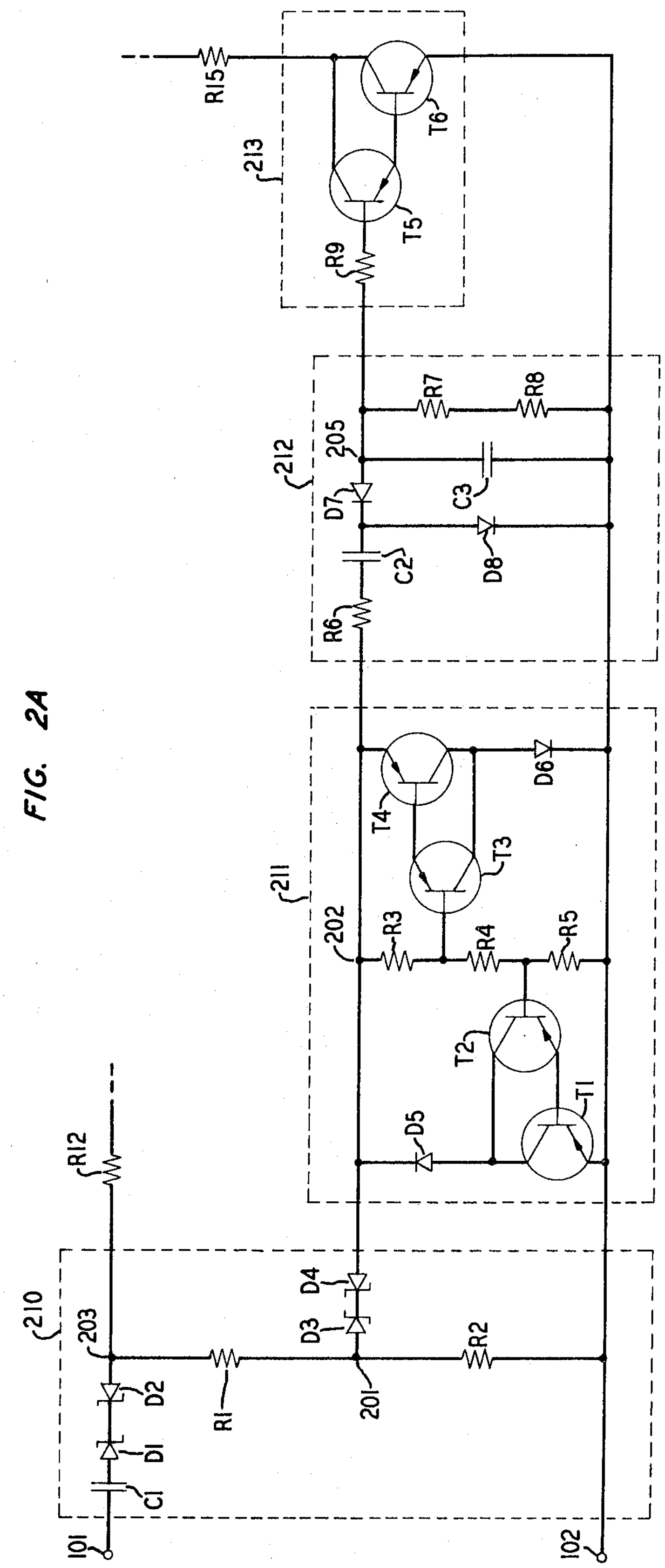
FIG. 2A is a schematic circuit diagram of the gating means portion of the tone ringer of FIG. 1.

FIG. 2A is a schematic circuit diagram of gating means 103. This circuit may, for convenience of description, be broken down into four subcircuits, but it should be clearly understood that proper operation of the overall circuit is equally dependent upon each. These subcircuits are (1) a threshold detector 210 comprising diodes D1-D4, resistors R1 and R2, and capacitor C1, (2) a limiter 211 comprising transistors T1-T4, diodes D5 and D6, and resistors R3-R5, (3) an averaging circuit 212 comprising diodes D7 and D8, resistors R6-R8, and capacitors C2 and C3, and (4) a transistor switch 213 comprising transistors T5 and T6, and resistor R9.

Figure 5A:
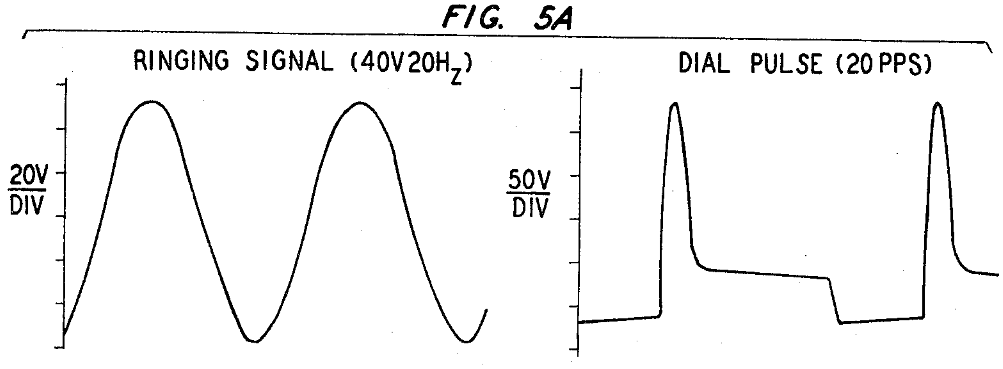
FIGS. 5A, B, and C depict various voltage waveforms measured at specific points within the tone ringer of FIG. 3, for both valid input signals and for dial pulses.

A better understanding of the operation of the gating means portion of the tone ringer circuit will be obtained by reference to FIG. 5A, which represents typical voltage waveforms that may appear across lines 101, 102. Valid signals are characteristically sinusoidal in nature, with magnitudes on the order of 40 to 110 volts AC, at frequencies of 20 or 30 Hz, and may be superimposed upon central office battery voltages, typically 48 volts DC. Unwanted signals can be caused by various sources, such as dial pulsing, switchhook flashing, lightning surges and noise. Of these, dial pulses have been found to be the most difficult to discriminate against, since, as shown, they may also be generated at a frequency of 20 pps, and can have magnitudes of 200 volts peak, or greater. Dial pulses are not sinusoidal in nature, but rather are characterized in that they are unsymmetrical spikes, having rapid rise and decay times. As will be seen hereinafter, gating means 103 takes advantage of this fact in the process of discrimination.

Figure 5B:
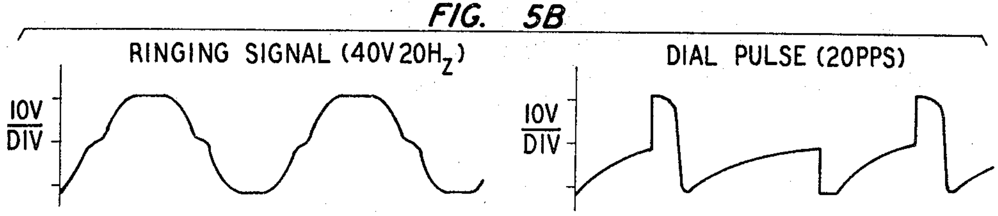

Turning now to a detailed description of the operation of threshold detector subcircuit 210, it will be noted that capacitor C1 first serves to block the direct current component of incoming signals received over lines 101, 102. Back-to-back Zener diodes D1 and D2, by virtue of their breakdown voltage, next set a threshold which must be exceeded by incoming signals in order for them to appear at voltage divider resistors R1 and R2. These diodes also insure that the bridging impedance of the tone ringer circuit is kept very high with respect to speech signals applied across lines 101, 102. Ringing signal and dial pulse waveforms appearing at point 201 are depicted in FIG. 5B. Signals which succeed in overcoming the first threshold are next applied across back-to-back Zener diodes D3 and D4, which further serve to eliminate weak signals.

The signal remaining at point 202 is limited in amplitude by means of symmetrical transistor limiter subcircuit 211. This subcircuit comprises three arms, essentially connected in parallel circuit relation. The center arm, made up of resistors R3, R4 and R5, serves as a voltage divider. Each of the remaining arms consists of a pair of transistors, T1, T2 and T3, T4, connected in Darlington arrangement, and a diode, D5, D6. The base terminal of Darlington transistor T3 is connected to the junction of resistors R3 and R4. The collector terminals of transistors T3 and T4 are connected to each other, and to the anode of diode D6, the cathode of which is connected to line 102. The emitter terminal of transistor T3 is connected to the base terminal of transistor T4, whose emitter terminal is connected to point 202. The remaining arm is connected in a similar fashion, with the base terminal of Darlington transistor T2 connected to the junction of resistors R4 and R5. The collector terminals of transistors T1 and T2 are connected to each other and to the anode of diode D6, the cathode of which is connected to point 202. The emitter terminal of transistor T2 is connected to the base terminal of transistor T1, whose emitter terminal is connected to line 102.

Diodes D5 and D6 serve to protect against damage to the respective transistors connected thereto, caused by large reverse voltages which may appear across the limiter circuit. Each of these diodes may be fabricated from the emitter-base junction of a transistor having its collector and base terminals shorted together.

Limiter subcircuit 211 can best be described by explaining its operation under various input conditions. As the voltage at point 202 increases with respect to line 102, the voltage drop across resistor R3 increases proportionately. When the base of transistor T3 becomes sufficiently negative with respect to the emitter of transistor T4, conduction begins, creating a low resistance path from point 202 through diode D6 to line 102. Further positive increases of voltage at point 202 are thus limited. In a similar fashion, as the voltage at point 202 decreases with respect to line 202, a proportional negative voltage appears across the base of transistor T2 and the emitter of transistor T1. When this voltage becomes sufficiently great to cause conduction in transistor T1, a low impedance path is established between line 102 through diode D5 to point 202, and further decreases in voltage at point 202 are limited.

Figure 5C:
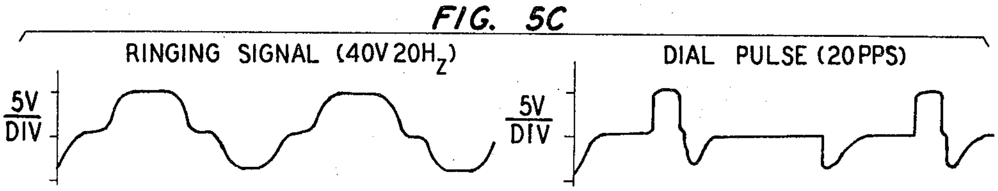

FIG. 5C represents a comparison of voltage waveforms at point 202 as a result of worst case input conditions, i.e., minimum ringing signal and maximum dial pulse voltages. It will be seen that valid signals retain their characteristic symmetrical shape, and have a relatively high energy content, whereas dial pulses are unsymmetrical and relatively low in energy content.

It is to be noted that Darlington transistors T1, T2, and T3, T4, possess the additional feature of providing temperature compensation for transistor switch T5, T6. This occurs by virtue of the fact that the voltage needed to turn Darlington transistors T5 and T6 ON is a function of two emitter-base junctions, and the clipping action of limiter circuit 211 is similarly dependent on two such junctions, formed by each of the Darlington transistor pairs T1, T2 and T3, T4. As a result, any temperature effects on the threshold of transistor switch T5, T6 will be counterbalanced by identical changes in the voltage applied to the switch by the limiter circuit.

The incoming signal, following limiting, is next applied to averaging subcircuit 212, having effective input terminals at point 202 and line 102. Resistor R6, one terminal of which is connected to point 202, serves to regulate the amount of current flowing into the averager subcircuit by establishing a time constant in conjunction with capacitor C2. The other terminal of resistor R6 is connected to one terminal of capacitor C2. The remaining terminal of capacitor C2 is connected to the anode of diode D8, the cathode of which is connected to line 102, and to the cathode of diode D7. The anode of diode D7 is connected to one terminal of capacitor C3 at point 205, the other terminal of which is also connected to line 102. The series combination of resistors R7 and R8 is connected across capacitor C3, and provides a discharge path therefor.

During the quarter cycle when the voltage between point 202 and line 102 is increasing from zero in a positive direction, current flows through current limiting resistor R6, capacitor C2, diode D8, to line 102. Capacitor C3 is not charged, since current flow is diverted by the low impedance path through diode D8. During this quarter cycle, capacitor C2 is charged at a rate determined by the RC loop time constant. In the next quarter cycle, when the input voltage is decreasing from its maximum value toward zero, charged capacitor C2 acts as a battery in series with the input voltage. Current flows from line 102 through capacitor C3, diode D7, capacitor C2 and current limiting resistor R6 to point 202. The voltage on capacitor C3 begins to increase, point 205 becoming negative with respect to line 102. Capacitor C3 continues to charge throughout the entire negative half cycle of input voltage, the rate of charge again being controlled by the RC loop time constant.

At the end of a complete cycle, capacitor C3 has become charged, in the case of valid input ringing signals, to a voltage approaching twice the maximum voltage at point 202. This condition occurs due to the fact that valid signals remain at their maximum level for a relatively long period of time per cycle, as indicated by their relatively high RMS value, thus allowing full charging of capacitors C2 and C3. In comparison, where dial pulses or other transients are applied as inputs, full charging is not possible. These signals are relatively low in energy content, since they remain at their maximum level for only a relatively short period of time per cycle. Complete charging of capacitors C2 and C3 is therefore prevented, and a discrimination capability is thus achieved.

Transistor switch subcircuit 213 comprises transistors T5 and T6 connected in Darlington arrangement, with one terminal of resistor R9 connected to the base terminal of transistor T5. Resistor R9 prevents reverse breakdown of the base-emitter junction of transistors T5 and T6 from limiting the voltage that can appear across capacitor C3. The remaining terminal of resistor R9 is connected directly to one terminal of capacitor C3, the remaining terminal of which is connected to the emitter terminal of transistor T6. When the voltage across capacitor C3 reaches a sufficient magnitude, as it does only in the presence of valid ringing signals, transistors T5 and T6 begin to conduct. As will be explained later, this switching effect is used to actuate the remainder of the tone ringer circuit.

FIG. 2B presents a schematic circuit diagram of power conversion means 106. As stated previously, this circuit functions to provide a rectified and regulated source of output power derived from the input ringing signal. Point 203 and line 102 are the effective input terminals of this circuit. On positive half cycles of input voltage, diode D10, connected in parallel across resistors R10 and R11, provides a low impedance path such that capacitor C4, also connected in parallel across the line, does not charge. When the incoming voltage becomes negative, however, capacitor C4 does become charged, the current path being from line 102 through capacitor C4, diode D11 and resistor R12 to point 203. When the voltage drop across resistor R10 reaches the breakdown voltage of Zener diode D9, the emitter-base junction of transistor T7 becomes forward biased. Transistor T7 then begins to conduct, preventing further charging of capacitor C4. By selecting the resistances of resistors R10 and R11 such that R10/(R10 + R11) = $1/n$, it should be apparent that the maximum voltage to which capacitor C4 can charge will be limited to $n$ times the breakdown voltage of Zener diode D9. This circuit thus provides a convenient means for readily duplicating the action of $n$ Zener diodes in series circuit relation, which can be readily fabricated in integrated circuit form.

Figure 6A:
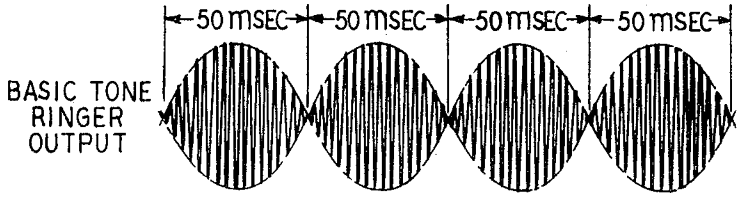
FIGS. 6A, B, C and D depict voltage waveforms measured at the tone ringer output, for various types of audible signals.

The voltage supplied across capacitor C4 is used to provide power for the remaining tone ringer circuitry. While the maximum voltage appearing across capacitor C4 is regulated by the Zener diode action of power conversion means 106, the circuit is nevertheless designed to allow the "ripples" in the input voltage to be applied to oscillatory generator means 104. As a result, standard 20 Hz ringing signals will produce an audible output consisting of a steady tone, modulated at a 20 Hz rate. FIG. 6A depicts the tone ringer output voltage waveform for this condition. Elimination of this ripple effect will be discussed hereinafter, in connection with the provision of a distinctive ringing capability.

FIG. 2C is a schematic circuit diagram of oscillatory generator means 104. While this circuit may comprise any standard means of producing oscillators, such as a twin-T oscillator, an astable multivibrator circuit is preferred. The multivibrator circuit comprises transistors T12 and T13, the base terminal of transistor T12 being connected to the collector terminal of transistor T13 through capacitor C6, and the base terminal of transistor T13 being connected to the collector terminal of transistor T12 through capacitor C5 and diode D12. Resistors R17 and R19 connect the collector terminals of transistors T12 and T13, respectively, to line 215. Resistors R18 and R20 are connected to the bases of transistors T13 and T12 respectively, and their remaining terminals are connected together and to one terminal of resistor R21, the remaining terminal of which is connected to line 215. Transistor T14 has its base terminal connected to the collector terminal of transistor T12, its collector terminal connected to line 215, and its emitter terminal connected to the junction between capacitor C5 and diode D12.

Direct current power to drive the multivibrator circuit is provided to line 215 via conducting transistor T9 from charged capacitor C4. The output of the multivibrator is taken from the emitter terminal of transistor T13, which is connected to the base terminal of transistor T15. Resistor R21, which is common to both R-C arms of the multivibrator circuit, is used to control the rate at which capacitors C5 and C6 will charge, thus regulating the output frequency. As will be seen hereinafter, resistor R21 is important in the provision of a distinctive ringing capability. Transistor T14 serves to provide a low impedance path for quickly discharging capacitor C5. This assures that a relatively low duty cycle (ratio of ON time to OFF time) can be achieved, thus improving multivibrator efficiency. Further description of the operation of the multivibrator circuit is unnecessary, since reference to any standard text will provide the reader with these details.

Figure 3A:
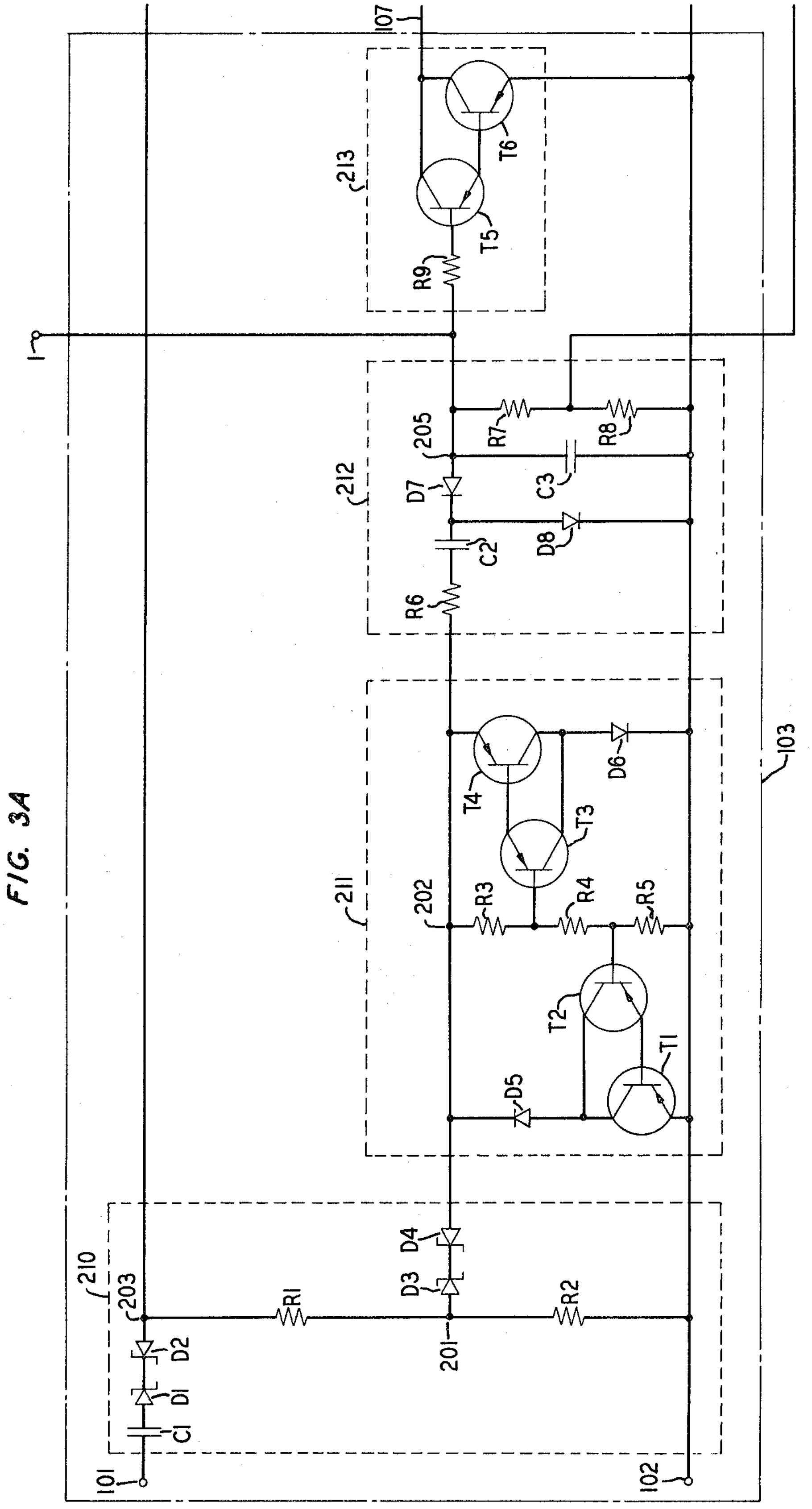
FIGS. 3A and B are schematic circuit diagrams of the entire basic tone ringer shown in block form in FIG. 1.
Figure 3B:
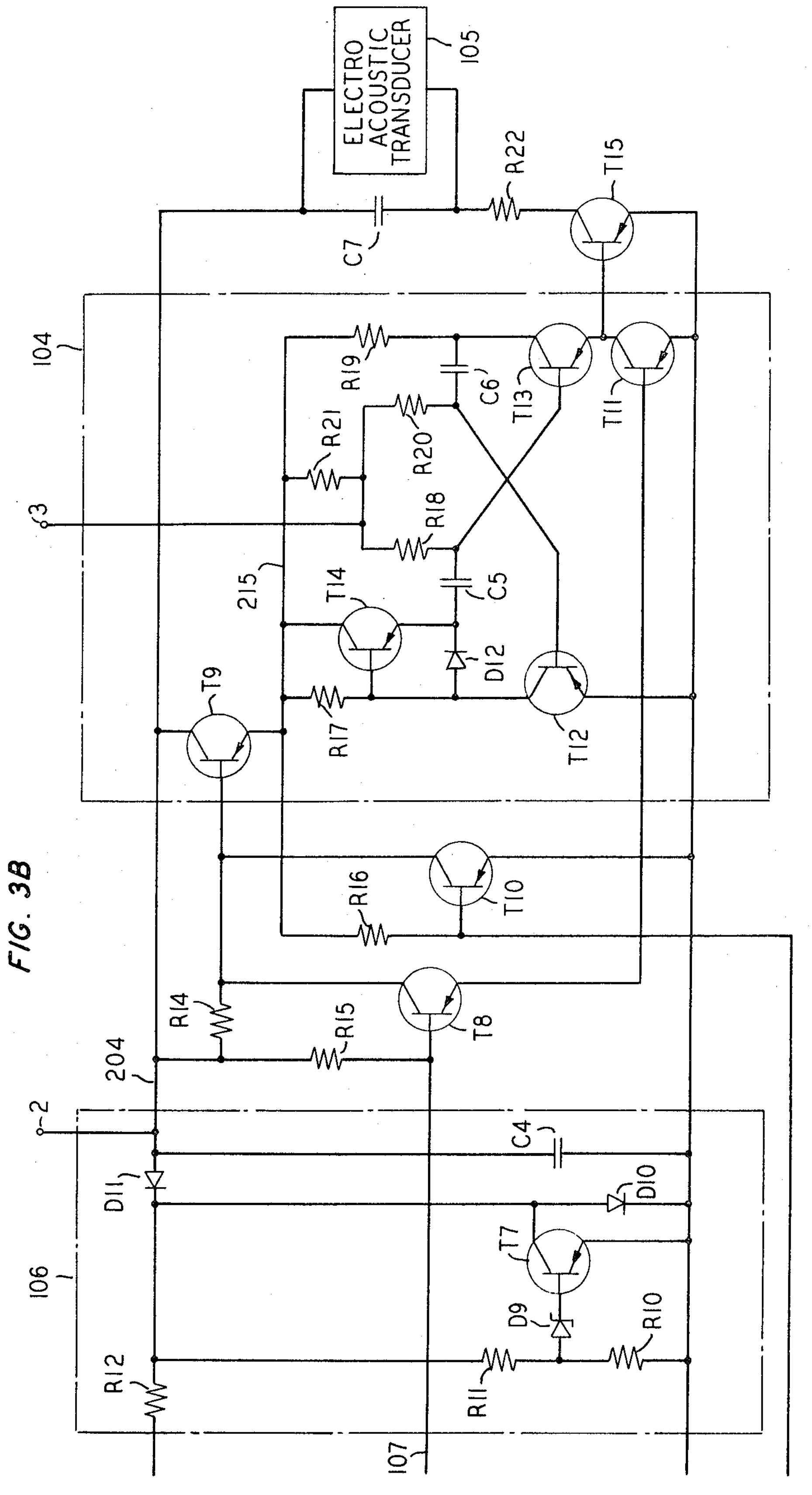

FIGS. 3A and B present schematic circuit diagrams of the entire basic tone ringer circuit. For convenience, gating means 103, oscillatory generating means 104, and power conversion 106 are each identified by dotted lines. Reference designations used in previous figures are retained, such that like components have like designations.

Interconnecting circuitry between transistor switch T5, T6, and oscillatory generator means 104 comprises transistors T8-T11, and resistors R14-R16. The base terminal of transistor T8 is connected to the collector terminals of transistors T5 and T6. The emitter terminal of transistor T8 is connected to the base terminal of transistor T11, while the collector terminal of transistor T8 is connected both to the base terminal of transistor T9 and to the collector terminal of transistor T10. The emitter terminal of transistor T9 is connected to one terminal of resistor R16, and to line 215. The other terminal of resistor R16 is connected to the base terminal of transistor T10 and to the junction between resistors R7 and R8. The emitter terminals of transistors T10 and T11 are both connected to line 102. The collector terminal of transistor T11 is connected to the emitter terminal of transistor T13 and to the base terminal of transistor T15. The collector terminal of transistor T9 is connected to point 204 to which is also connected one terminal of resistor R15, the remaining terminal of which is connected to the collectors of transistors T5 and T6. Resistor R14 is connected between point 204 and the base terminal of transistor T9.

Before considering total circuit operation in the presence of a valid ringing signal, it will be instructive to consider the reaction of the circuit in the case where transients or unwanted pulses are applied. As stated previously, all such invalid inputs will be ineffective to charge capacitor C3 sufficiently to actuate transistor switch T5 and T6. Accordingly, these transistors will be in their nonconducting state. However, it is entirely possible that capacitor C4 will become charged as a result of an applied voltage. Should this condition occur, it is important that the circuit be unresponsive, so that no output sound will be produced. This feature is assured in two ways. First, the voltage appearing across capacitor C4 also appears across the series combination of resistor R15, the base-emitter junction of transistor T8, and the base-emitter junction of transistor T11. These transistors are thus turned ON. In this case, the base of transistor T9 is maintained at a voltage equal to one base-emitter junction above the potential of line 102, by virtue of the path through conducting transistor T8, and the base-emitter junction of transistor T11. The emitter of transistor T9 is also maintained at the same voltage, by virtue of the path through resistor R16 and the base-emitter junction of transistor T10. Since the emitter and base terminals of transistor T9 are thus at the identical voltage, transistor T9 is in its nonconducting state. Line 215 thus does not receive any voltage from capacitor C4, and the multivibrator is prevented from operating. The second safeguard is provided by conducting transistor T11, which effectively shorts the emitter and base terminal of transistor T15. Since transistor T15 is thus kept in a nonconducting condition, the electromechanical transducer in series therewith is prevented from operating. These circuit features thus assure that any transients generated at the input to the tone ringer, or within the ringer itself, will not be capable of causing the output transducer to produce unwanted audible sounds.

Turning now to circuit operation in the presence of valid ringing signals, it will be recalled that transistors T5 and T6 begin to conduct by virtue of the operation of gating means 103. As a result, the base of transistor T8 is shorted to positive line 102, causing transistors T8 and T11 to become nonconducting. The impediment to conduction of transistor T15 is thus removed. With transistor T8 nonconducting, the base of transistor T9 becomes negative with respect to its emitter, and transistor T9 begins to conduct, thereby applying the voltage of capacitor C4 to the multivibrator at line 215.

Since the output frequency of the multivibrator is dependent upon the voltage applied at line 215, it is necessary to regulate this voltage. This feature is provided by resistors R16 and R8, in combination with transistors T9 and T10. Assume, for example, that the resistance of resistor R8 is selected to be one ninth of the resistance of resistor R16. When the voltage at line 215 reaches 10 times the voltage needed to forward bias transistor T10, one tenth of that voltage appears across resistor R8, and does indeed turn transistor T10 ON. The base of transistor T9 is then directly connected to line 102, thereby turning transistor T9 OFF. When the voltage across resistor R8 again diminishes to a value sufficient to turn transistor T10 OFF, transistor T9 again begins to conduct. This regulating action maintains line 215 at a voltage that is directly proportional to the emitter-base turn-on voltage of transistor T10. Temperature compensation of the multivibrator is also achieved, since the multivibrator output frequency, which is normally proportional to the ratio of emitter-base turn-on voltage to power supply voltage, is therefore made substantially constant, independent of temperature induced changes in transistor characteristics.

Transistors T9 and T10 provide the additional feature of assuring that transistors T5 and T6 "snap" on in the presence of valid signals. By making the resistance of resistor R7 very large compared to the value of resistor R8, the voltage across the latter will be very small when transistors T5 and T6 initially turn on. When transistors T9 and T10 begin to conduct, the voltage across resistor R8 suddenly increases to a value equal to the emitter-base voltage drop of transistor T10, which is connected in parallel therewith. This feedback effect drives transistors T5 and T6 further into their conducting state, thus assuring their continued operation in the presence of valid ringing signals.

The output portion of the tone ringer circuit comprises transistor T15, resistor R22, capacitor C7 and electroacoustical transducer 105.

One terminal of capacitor C7 is connected to line 204, and the other connected to resistor R22, which is serially connected to the collector terminal of transistor T15, the emitter of which is connected to line 102. Transducer 105 is connected directly across capacitor C7. Oscillations produced at the emitter terminal of transistor T13, which is connected to the base terminal of transistor T15, cause the latter to switch between its ON and OFF conditions at a frequency determined by oscillatory generator means 104, thus producing corresponding voltage variations across capacitor C7 and transducer 105. An audible output is thus generated.

Several methods are available for altering the sound output of the basic tone ringer circuit, in order to provide a distinctive ringing capability. For example, the frequency or dutycycle of oscillatory generator means 104 can be altered, thus changing the characteristics of the output tone produced. These changes would, however, be of a permanent nature, and would not readily permit mass production of a single type of basic tone ringer.

A preferred alternative is to make all required changes externally. The tone ringer circuit disclosed herein is well suited to such an approach, since by attaching various logic and power supply circuits to three points within the basic tone ringer, a distinctive ringing feature can be achieved. These attachment points, labelled 1, 2, and 3, are shown in FIG. 4. Point 1 is derived at the junction of the anode of diode D7 and one terminal of capacitor C3. Point 2 is derived directly from line 204. Point 3 is derived from the junction of resistors R18, R20, and R21.

Figure 4A:
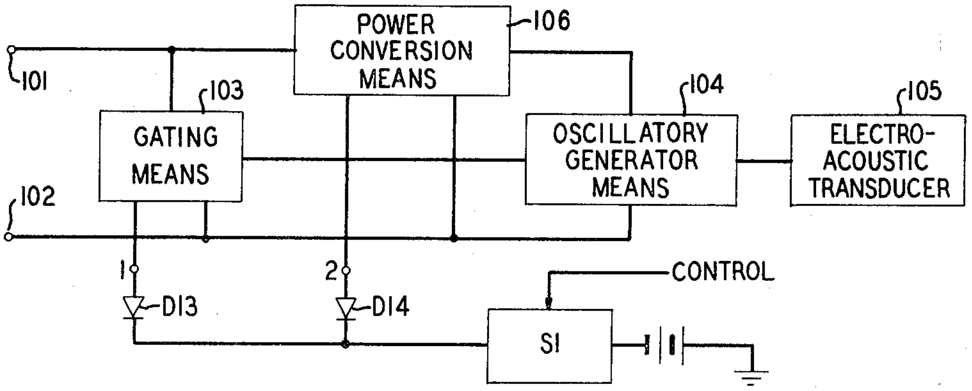
FIG. 4A is a block diagram of the basic tone ringer of FIG. 1, modified in accordance with the invention for the provision of steady ringing tones.
Figure 6B:
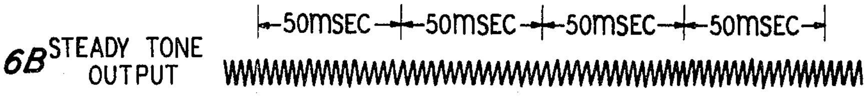

FIG. 4A shows in block diagram form the simple external modifications to the basic ringer circuit required to produce a steady tone output. In this configuration, points 1 and 2 are connected through diodes D13 and D14 respectively, and switch S1, to a source of negative direct current power. Upon closure of switch S1, gating means 103 is enabled, thus actuating oscillatory generator means 104. In addition, the voltage across capacitor C4 of power conversion means 106 is held constant. As a result, a steady, unmodulated tone is produced. The voltage waveform appearing across transducer 105 is depicted in FIG. 6B.

Figure 4B:
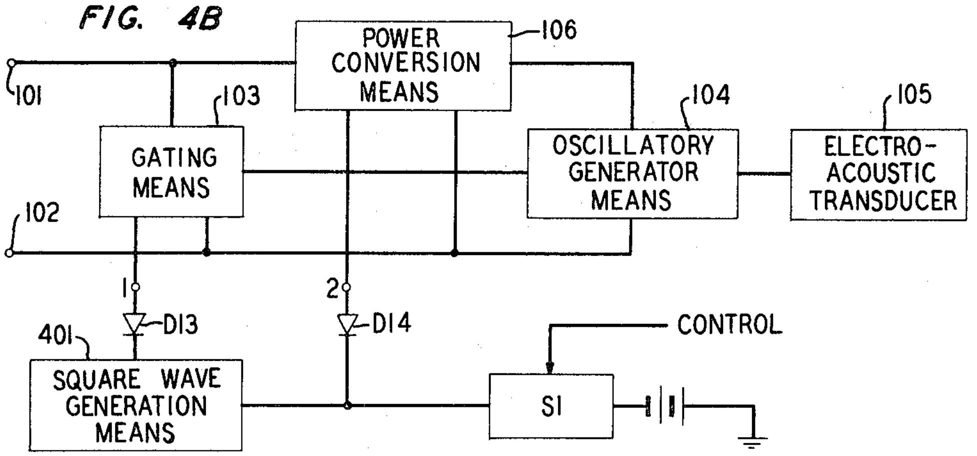
FIG. 4B shows a similar modification for the production of amplitude modulated ringing tones.
Figure 6C:
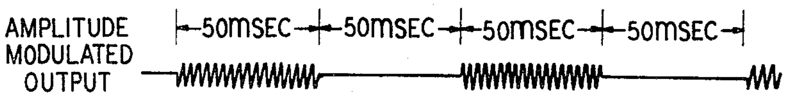

FIG. 4B presents, in block diagram form, the modifications to the basic ringer circuit needed to provide amplitude modulated ringing. In this configuration, terminal 2 is again connected through diode D14 and switch S1 to a source of negative DC potential, thereby providing a constant voltage output from power conversion means 106. Square wave generation means 401 is connected to terminal 1 through diode D13, and is similarly controlled by switch S1. When actuated, square wave generation means 401 serves to turn gating means 103 ON and OFF at a preselected beat rate. The voltage waveform appearing across transducer 105 for tones modulated at a 10 Hz beat rate is depicted in FIG. 6C.

Figure 4C:
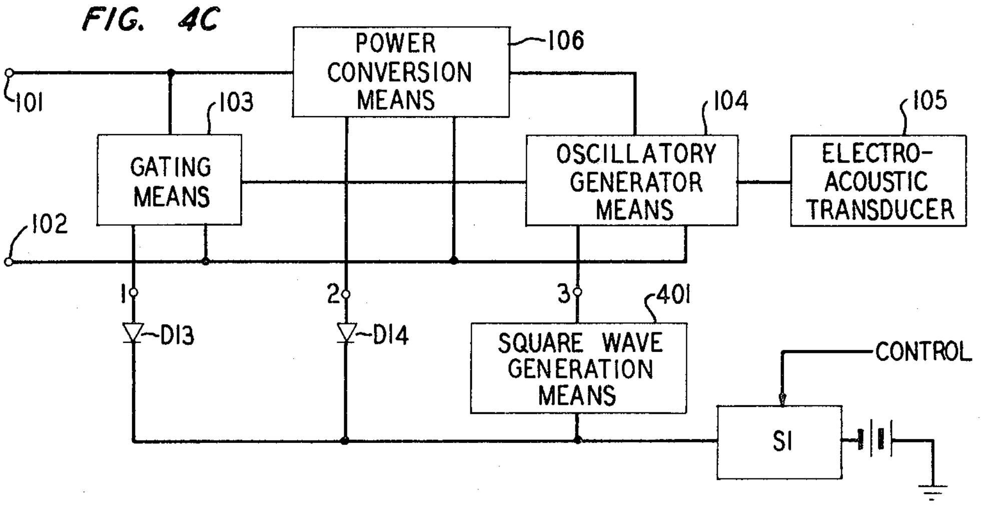
FIG. 4C is a block diagram of the basic tone ringer of FIG. 1 modified in accordance with the invention for the production of frequency modulated ringing tones.
Figure 6D:
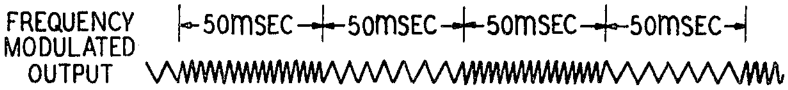

FIG. 4C presents, in block diagram form, the modifications to the basic tone ringer circuitry required to produce frequency modulated ringing, which is, in this instance, defined as sound in which the fundamental drive frequency is alternately changed from one frequency to another at a particular beat rate. This feature is obtained by attaching terminals 1 and 2 to a source of negative DC potential through diodes D13 and D14, respectively, and switch S1, in the same manner as described previously in connection with the provision of a steady tone capability. In addition, square wave generation means 401 is connected between terminal 3 and the above-mentioned voltage source through switch S1, thereby causing the voltage across resistor R21 to vary periodically. Since, as previously mentioned, the voltage across resistor R21 controls the frequency of oscillatory generator means 104, frequency modulated tones are thus produced upon actuation of switch S1. The output voltage waveform appearing across transducer 105 for frequency modulation at a 10 Hz beat rate is depicted in FIG. 6D.

In each of the circuits described above (FIGS. 4A–4C), actuation of switch S1 may be controlled manually or automatically. In the case of manual control, switch S1 may, for example, be located directly on each of several subscriber's telephone sets having an intercom calling capability. In this event, actuation of switch S1 causes an audible output at the called set which is distinct from the sound produced by an outside call. This result is achieved since, depending on the circuit arrangement chosen, steady, amplitude or frequency modulated tones will be generated by intercom calls, rather than the characteristic 20 Hz rippled tone produced by the basic tone ringer as a result of outside calls. In addition, different sets may be made audibly distinguishable by the use of different fundamental tone frequencies or frequency modulation combinations.

To provide automatic control, switch S1 may be directly connected to gating means 103. In this event, all incoming calls to a particular telephone set produce an audible output, be it a steady, amplitude or frequency modulated tone, whose characteristics are dependent upon the tone ringer configuration preselected by the customer. Subscribers having multiple telephone sets or services, by specifying different ringing characteristics for each set or service, are thus able to determine audibly which set is being called or the type of incoming call.

It is to be understood that the embodiments described herein are merely illustrative of the principles of the invention. Various modifications thereto may be effected by persons skilled in the art without departing from the spirit and scope of the invention.

What is claimed is:

1. A tone ringer circuit comprising, in combination,
input terminals for the reception of ringing signals,
gating means for distinguishing between valid and invalid ringing signals applied across said input terminals,
an electroacoustic transducer for producing an audible output,
oscillatory generator means, responsive to said gating means, for actuating said electroacoustic transducer,
power conversion means for supplying ringing energy to said oscillatory generator means,
and means for preventing the production of an audible output in response to transient voltages generated within said tone ringer circuit.

2. Apparatus in accordance with claim 1 wherein said last named means comprises,
first and second transistor switches,
said first transistor switch disconnecting said power conversion means from said oscillatory generator means in the presence of said transient voltages,
and said second transistor switch disconnecting said electroacoustic transducer from said oscillatory generator means in the presence of said transient voltages.

3. In a tone ringer, apparatus for distinguishing between valid and invalid ringing signals comprising, in combination,
a threshold detector circuit,
a limiter circuit,
an averaging circuit,
and a transistor switch circuit,
wherein said ringing signals which exceed a voltage level set by said threshold detector circuit are limited in amplitude by said limiter circuit and applied to said averaging circuit, the output of which is sufficient to actuate said transistor switch circuit only if said ringing signals include preselected characteristics of voltage, frequency and power.

4. Apparatus in accordance with claim 3 wherein said threshold detector circuit comprises a plurality of pairs of Zener diodes, each Zener diode of said pairs being connected in series circuit relation with the other of said Zener diodes and in opposite polarity therewith.

5. Apparatus for the production of an audible output in a communications system, comprising, in combination,
input means for the reception of actuating signals,
gating means responsive only to actuating signals having preselected characteristics,
said preselected characteristics including the energy content per cycle of said actuating signal,
oscillatory generator means responsively enabled by said gating means,
and transducing means for converting electrical oscillations produced by said oscillatory generator means to an audible output,
whereby an audible output is produced only in the presence of actuating signals having said preselected characteristics.

6. Apparatus in accordance with claim 1 further including,
pulse generating means,
a source of direct current potential,
first switching means for selectively connecting said source of direct current potential directly to said power conversion means, in order to obtain a substantially constant voltage output therefrom,
and second switching means for selectively connecting said pulse generating means to said oscillatory generator means, in order to vary periodically the output frequency thereof,
thereby enabling production of an audible output that periodically varies in frequency.

7. Apparatus in accordance with claim 6 wherein said first and second switching means comprise a single externally controllable switch.

8. Apparatus in accordance with claim 6 wherein said first and second switching means comprise a single transistor switch controlled by said gating means.

9. Apparatus in accordance with claim 1 further including,
pulse generating means,
a source of direct current potential,
first switching means for selectively connecting said source of direct current potential directly to said power conversion means, in order to obtain a substantially constant voltage output therefrom,
and second switching means for selectively connecting said pulse generating means to said gating means, in order to produce periodic actuations thereof,
thereby enabling production of audible outputs that are periodically interrupted.

10. Apparatus in accordance with claim 9 wherein said first and second switching means comprise a single externally controllable switch.

11. Apparatus in accordance with claim 9 wherein said first and second switching means comprise a single transistor switch controlled by said gating means.

12. Apparatus in accordance with claim 1 further including,
a source of direct current potential,
first switching means for connecting said source of direct current potential directly to said power conversion means, in order to obtain a substantially constant output voltage therefrom,
and second switching means for selectively connecting said source of direct current potential to said gating means, thereby continuously actuating said gating means, thereby enabling production of audible outputs that are substantially constant in amplitude and frequency.

13. Apparatus in accordance with claim 12 wherein said first and second switching means comprise a single externally controllable switch.

14. Apparatus in accordance with claim 12 wherein said first and second switching means comprise a single transistor switch controlled by said gating means.

15. A tone ringer circuit comprising, in combination, gating means, oscillatory generator means, and electroacoustical transducer means, wherein said electroacoustical transducer means is energized by said oscillatory generator means in response to the application of a valid ringing signal to said gating means, the validity of said ringing signal being determined by measurement of preselected characteristics of its voltage, frequency and energy content.

16. Apparatus in accordance with claim 15 further including means for preventing the production of an audible output in response to transient voltages generated within said apparatus.

17. Apparatus in accordance with claim 16 wherein said last named means comprises a transistor switch responsive to said transient voltages for disabling said oscillatory generator means.

18. Apparatus in accordance with claim 16 wherein said last named means comprises a transistor switch responsive to said transient voltages for disabling said transducing means.

19. A signalling circuit adapted for connection to a telephone line comprising:

a switching circuit including a signalling device;

energy storage means;

circuit means for coupling said switching circuit and said energy storage means to said telephone line wherein said telephone line applies a unidirectional energizing potential to said switching circuit and said energy storage means; and second circuit means coupling said switching circuit to said telephone line for detecting the presence of ringing signals on said telephone line to enable said switching circuit to pass current pulses through said signalling device from said energy storage means and actuate said signalling device.

* * * * *